UNITED STATES PATENT OFFICE.

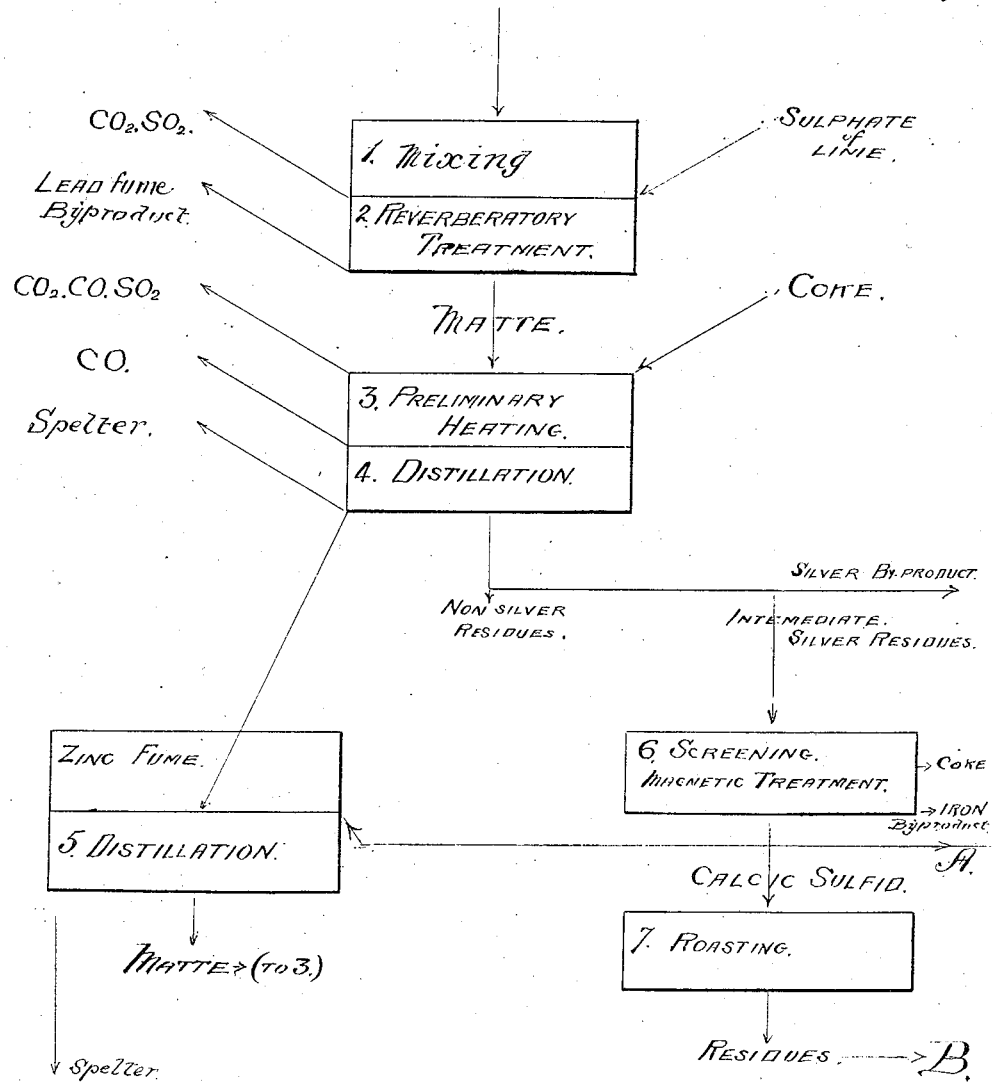

JOHN JAMES FINGLAND, OF KASLO, BRITISH COLUMBIA, CANADA.

PROCESS FOR THE MANUFACTURE OF SPELTER FROM FERRUGINOUS AND ADMIXED ZINC-BLEND ORES.

1,157,375.   Specification of Letters Patent.   Patented Oct. 19, 1915.

Application filed September 10, 1913. Serial No. 789,098.

*To all whom it may concern:*

Be it known that I, JOHN JAMES FINGLAND, of the city of Kaslo, in the West Kootenay district of the Province of British Columbia, Canada, have invented new and useful Improvements in Processes for the Manufacture of Spelter from Ferruginous and Admixed Zinc-Blend Ores, of which the following is a specification.

In the ordinary treatment of admixed sulfid ores by gravity concentration two products are obtained; one containing the major portion of the lead contents, the other containing the major portion of the zinc contents, together with various minerals or admixed minerals of like specific gravity, such as, pyrite, pyrrhotite, copper pyrites, galena, barytes, etc. This zinc product ordinarily contains insufficient zinc contents, and excessive proportions of deleterious substances, such as iron, to render it expedient to recover the zinc by distillation in the ordinary manner. It is frequently subjected to an enriching process, such as, roasting and magnetic separation in order to produce a product of marketable grade of zinc contents.

This invention relates to the treatment of this admixed zinc concentrate from gravity separation, or enriched products derived therefrom, not amenable to treatment by the ordinary process, through the presence of deleterious substances, such as lime; or crude ores of a like character but containing galena in greater proportion which, owing to their physical character and high zinc contents are not amenable to gravity concentration, nor to direct smelting on a lead basis; but only such ores as are comparatively free, or which can be freed from silicious matter by a preliminary treatment.

It has for its object the treatment of these types of ores and products by a smelting process, for the recovery of spelter, and at the same time collecting the lead, copper, silver, and gold, which may be contained in them, in the form of products amenable to their ordinary metallurgical treatment; thus rendering the recovery of the metal contents of these ores and products more complete and expeditious than is possible by the ordinary process.

This invention comprises three distinct steps:—1. The preparation of a zinc calcic oxid sulfid matte. 2. The reduction of this matte by carbonaceous matter, for the production of spelter and zinc dust. 3. The production of spelter from the zinc dust of the previous operation.

The zinc calcic oxid sulfid matte possesses the following metallurgical composition,

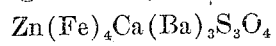

or

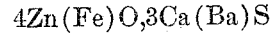

where the (Fe) and (Ba) are vicarious constituents. It is prepared by mixing crude and roasted ores with lime rock, the calcination of which can be effected either during the formation of the matte, or previously, together with return products from the later stages, consisting of calcic sulfid (CaS), or the roasted product of this viz: an admixture of lime (CaO), carbonate of lime ($CaCO_3$), and sulfate of lime ($CaSO_4$), proportionately to allow the following chemical unions or reactions to take place on heating.

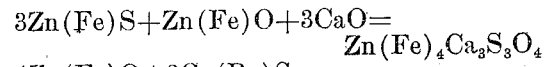
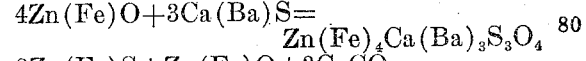
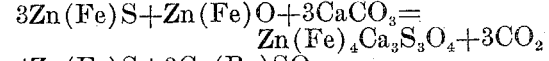
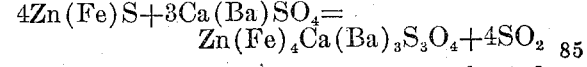

The mixtures thus prepared are heated gradually in a gas-fired, basic-lined reverberatory furnace, in such a manner that the charge is built up with the more plumbiferous ores containing excess of lime in the early stages, finishing with the more zinkiferous ores with a corresponding deficiency of lime. During the heating the galena contained in the charge reacts with lime, forming calcic sulfid and litharge (PbO), the latter volatilizing, to be collected as flue dust or lead fume. When the lead has been thus removed, the temperature is gradually raised to about 1500° C. when the mass, after fritting together at lower temperatures, assumes the liquid state as zinc calcic oxid sulfid matte; a stable substance at that temperature in absence of silicious, or carbonaceous matter, and which is capable of assimilating and dissolving small quantities of sulfids or oxids of zinc, iron, or lime which may be in excess of the aforementioned proportions. This matte is also rendered more fluid, *i. e.*, the melting point is lowered, by addition of sulfate of lime. The matte is drawn off, cooled, crushed, and passed over to the second step. This matte is admixed with one-half its weight of carbonaceous matter,—coke as free as possible from silicious matter and of a size larger than the crushed matte,—and subjected to a preliminary heating out of contact with air to 600° C., thus effecting the reduction of the oxids of iron to the metallic state; the reduction of any sulfate of lime ($CaSO_4$) to calcic sulfid (CaS); and the removal of the gases evolved from these reactions, which have a tendency to oxidize the zinc in the condenser. Distillation of the zinc is then effected in a basic-lined retort at temperatures between 1100° C and 1200° C, for the recovery of spelter and zinc dust. The residues from the retort are screened free from coke, the iron removed by magnetic means, before being returned to the initial stage, either crude, or roasted, to collect a further quota of gold, silver, and copper contained in the ores, until they are sufficiently enriched in these metals to form a valuable by-product.

The zinc dust collected from the previous operation is mixed with a sufficiency of the cleaned calcic sulfid residue to allow of the formation of the zinc calcic oxid sulfid matte by union with the zinc oxid contained in the zinc dust. This admixture is heated in a basic-lined retort, fitted with feed inlet and taphole so as to allow of continuous operation. The distillation and condensation of the spelter is thus conducted without the presence of oxidizing gases, which ordinarily occur when carbonaceous matter is utilized to decompose the zinc oxid. The tapped matte is returned to the previous step.

The accompanying drawing represents a diagrammatic representation of the process in seven stages.

In stage 1 the ores and fluxes, together with the return products are mixed according to the already indicated equations. Crude ores are represented by the formula $Zn(Fe)S$; roasted ores, by $Zn(Fe)O$; the return product from stage 6 by, $Ca(Ba)S$; the return product from stage 7 by, $xCaO$, $yCaCO_3$, and $zCaSO_4$.

In stage 2 the production of the matte is indicated, also the removal sulfur dioxid ($SO_2$), carbon dioxid ($CO_2$), and lead fume, as well as, the addition of sulfate of lime to the charge to correct high melting point irregularities.

In stage 3 the preliminary reduction takes place with removal of $CO_2$, CO, and $SO_2$ gases.

In stage 4 distillation is effected, with recovery of spelter and zinc dust. In the case of silverless ores, the residues from this stage are rejected. Where the ores are sufficiently argentiferous to give a valuable by-product at this stage, they are also removed from the process here; but where the silver values are intermediate between these extremes they are treated in stage 6.

In stage 6 the coke is screened out and the residue magnetically treated for the recovery of an iron by-product. The remaining calcic sulfid (CaS) residue has a threefold purpose: It is used to mix with roasted ores in the initial stage; it is utilized to mix with the zinc dust of the 4th stage, resulting in the production of spelter and matte in the 5th stage; (the latter product being identical with the product from the 2nd stage it is returned to stage 3); lastly, it passes to stage 7 to be roasted, an admixture of lime, carbonate of lime, and sulfate of lime resulting, which is returned to the initial stage to admix with crude ores.

What I claim and desire to secure by Letters Patent, is—

1. The herein described steps in the process of manufacturing spelter from ferruginous and admixed lead and zinc blende ores, which consists in heating a mixture of crude ore, roasted ore, and lime, thereby forming litharge and maintaining the heat treatment until the litharge has been driven off by volatilization.

2. The herein described steps in the process of manufacturing spelter from ferruginous and admixed lead and zinc blende ores, which consists in heating a mixture of crude ore, roasted ore, and lime, thereby forming litharge and maintaining the heat treatment until the litharge has been driven off by volatilization, and subsequently continuing the heat treatment at a raised temperature until a liquid zinc calcic oxid sulfid matte is produced.

3. The herein described steps in the process of manufacturing spelter from ferruginous and admixed lead and zinc blende ores, which consists in heating a mixture of crude ore, roasted ore, and lime, thereby forming litharge, maintaining the heat treatment until the litharge has been driven off by volatilization, and subsequently continuing the heat treatment at a temperature of substantially 1500° C. until a liquid zinc calcic oxid sulfid matte is produced.

4. The herein described steps in the process of manufacturing spelter from ferruginous and admixed ores, which consists in producing a zinc calcic oxid sulfid matte by heat treatment, cooling and crushing the matte, heating the crushed matte, together with carbonaceous matter out of contact with the air, and subsequently distilling the zinc.

5. The herein described steps in the process of manufacturing spelter from ferruginous and admixed ores, which consists in producing a zinc calcic oxid sulfid matte by heat treatment, cooling and crushing the matte, heating the crushed matte together with carbonaceous matter out of contact with the air, subsequently distilling the zinc, screening the residue, moving the iron by magnetic treatment, and roasting the product.

6. The herein described process of manufacturing spelter from ferruginous and admixed ores which consists in heating a mixture of crude ore, roasted ore, and lime, until a liquid zinc calcic oxid sulfid matte is produced, cooling and crushing the matte, mixing the crushed matte with one half its weight of carbonaceous matter, subjecting the mixture to preliminary heating out of contact with the air at substantially 600° C., thereby effecting the reduction of oxid of iron to the metallic state, the reduction of any sulfate of lime to calcic sulfid, and the removal of gases having a tendency to oxidize the zinc, and subsequently distilling the zinc.

JOHN JAMES FINGLAND.

Witnesses:
 H. S. WHELLAMS,
 JAMES ANDERSON.